United States Patent [19]

Harrington

[11] Patent Number: 5,043,711

[45] Date of Patent: Aug. 27, 1991

[54] REPRESENTATION OF POLYGONS DEFINED BY NON-ZERO WINDING NUMBERS

[75] Inventor: Steven J. Harrington, Holley, N.Y.

[73] Assignee: Xerox Corporation, Stamford, Conn.

[21] Appl. No.: 363,827

[22] Filed: Jun. 9, 1989

[51] Int. Cl.$^5$ ............................................. G09G 1/06
[52] U.S. Cl. .................................. 340/728; 360/747; 364/522
[58] Field of Search ............... 340/747, 728, 703; 364/522

[56] References Cited

U.S. PATENT DOCUMENTS

| | | | |
|---|---|---|---|
| 4,364,037 | 12/1982 | Walker | 340/703 |
| 4,554,538 | 11/1985 | Bieneman | 340/799 |
| 4,646,076 | 2/1987 | Wiedenman et al. | 340/728 |
| 4,677,574 | 6/1987 | Kausch | 340/703 |
| 4,815,009 | 3/1989 | Blatin | 364/518 |

OTHER PUBLICATIONS

"Polygon Painting Method", IBM Technical Disclosure Bulletin, vol. 28, No. 7, Dec. 1985, pp. 3080-3081.

Primary Examiner—Alvin E. Oberley
Assistant Examiner—Doon Yue Chow
Attorney, Agent, or Firm—Ronald F. Chapuran

[57] ABSTRACT

In a system having a frame buffer for generating an image wherein the image is defined as an outline having an interior described by the non-zero winding rule, the system including the mehtod of providing visual images along a scan direction comprising the steps of entering into the frame buffer predetermined direction codes, determining points of intersection and points of adjacent location in the scan direction, and spatially offsetting direction codes in the scan direction for the points of intersection and points of adjacent location in the scan direction.

18 Claims, 8 Drawing Sheets

DRAW THE BOUNDARY

FIND A SEED POINT

GROW REGION FROM SEED

FILL THE BOUNDARY

DRAW THE LEFT AND
RIGHT BOUNDARY

FOR EACH SCAN INVERT
THE COLOR WHEN A
BOUNDARY IS ENCOUNTERED

UNTIL ALL SCAN LINES ARE PROCESSED

FORM AN ORDERED
EDGE-LIST OF BOUNDARY
SEGMENTS

FOR EACH SCAN FIND AND
SORT THE BOUNDARIES FILLING
BETWEEN

UNTIL ALL SCAN LINES ARE PROCESSED

ODD WINDING NUMBER

NON-ZERO WINDING NUMBER

DIRECTION AND WINDING NUMBERS

REPRESENTATION OF POLYGONS DEFINED BY NON-ZERO WINDING NUMBERS

BACKGROUND OF THE INVENTION

The invention relates to electronic printers, and more particularly to an improved method for representation of an image for raster printing.

Modern computer graphics is based on the frame buffer. The frame buffer provides an internal representation of the image being constructed. Images are displayed as a raster pattern of colored spots or pixels. Frame buffers are blocks of memory partitioned into data entries for each spot on the display, and usually organized according to the raster. The data in the frame buffer element corresponding to a pixel describes the color of that pixel. With the development of the frame buffer and raster graphics came the realization that solid areas (such as polygons) could be described and imaged. But in order to display a polygon, one must convert from the representation in which it is first defined (usually a list of vertex points from which the line segments forming the boundary can be derived) to the format required by the frame buffer (the set of pixels which are enclosed by the polygon). This is called rasterization or scan-conversion, and several approaches have been tried.

One approach (called flood fill or seed fill) is to draw the boundary of the polygon in the frame buffer, using some color other than the background. Then starting at some point known to be within the polygon (the seed), the technique is to grow the region by changing the color of neighboring pixels until the boundary is reached as shown in FIG. 1. This technique can be used to accumulate overlapping polygons, but it may require multiple seeds to access isolated regions. Finding seed points can be difficult and costly.

Another set of algorithms are called parity techniques. If the raster is scanned from left to right, a polygon can be constructed by drawing its left and right boundaries (the leftmost and rightmost points filled regions on each scan line). An area containing the boundary can then be scanned, noting edges as they are crossed. If an odd number of edges are crossed to reach a pixel, then pixel is colored as interior to the polygon. If an even number of edges are crossed, the pixel is outside the polygon and is not colored as illustrated in FIG. 2. This technique does not require seed points, but handling multiple overlapping polygons requires two frame buffers (or one buffer with at least three possible states for each pixel). The technique is to use one buffer to draw the boundary and determine which pixels are interior to a given polygon, and the second frame buffer to actually accumulate the composite image. Note that the first buffer must be cleared between each polygon construction.

A third set of techniques is based on an ordered edge list. It is related to the parity scheme, but does not require the second frame buffer to draw the boundary. Instead, analytic descriptions of the boundary components are stored. The boundary must be represented in a form such that the intersection of the boundary with a scan line is easily calculated. The boundary is usually decomposed into straight-line edge segments, which are sorted into scan line order by their minimum-scan line endpoint. Then for each scan line the intersections with the edges are calculated and sorted into their order within the scan. These points are then used as the boundary for the interior pixels for that scan line. As with parity algorithms, a pixel on the scan line is considered interior if an odd number of boundary points are crossed to reach it as shown in FIG. 3. While this technique does not require the second frame buffer, it is limited to regions with edge descriptions which are monotonic with respect to scan line number, and which can be generated in scan line order. It also entails the processing overhead of decomposing and sorting the polygon's edge segments.

Also included in the prior art is U.S. Pat. No. 4,815,009 to Blatin discloses an algorithm for filling an image outline defined by a plurality of vectors and converting the outline into a set of trapezoids. All areas have a winding number initially set equal to zero. A means of the incrementing and decrementing a counter each time a vector is crossed in a scan line determines the area winding number. Any area with an odd or non-zero winding number, depending on the chosen method of determination, is considered within the outlines and is filled. This technique provides a way of handling objects defined by non-zero winding numbers, but it does so by extensive analysis of the object. It will only work for flat-edged objects, and it must find intersections of edges, sort edges and extract trapezoids. Furthermore, if the trapezoids are filled as suggested, then processing an object requires storing every pixel for its area.

U.S. Pat. No. 4,554,538 to Bieneman discloses a multi-level raster scan display system for overlapping images. A digital memory stores words which are read with a raster scan signal to drive the display screen. An element of an image to be displayed is drawn, moved or erased by selectively incrementing or decrementing the appropriate memory locations. This allows relocation of images without affecting the underlying image content. However, in this system, the object is entered by its area rather than its perimeter requiring the changing of significantly more pixels. Also, this system requires much more storage to supply enough bits at each pixel to count the maximum number of overlapping objects that will occur.

Generally, all of the filling algorithms disclosed in the prior art are based on defining the interior of a polygon by odd winding number. The winding number for a point is the number of times that point is circled in tracing the polygon boundary. Defining a point to be interior if an odd number of boundaries are crossed to reach it is equivalent to defining interior points as having an odd winding number. There is, however, another definition for the interior of a polygon. A point can be defined as interior if it has a non-zero winding number, or a positive winding number can be used as the definition. Page-description languages such as Interpress and PostScript support both non-zero and odd winding number conventions.

The alternative definitions yield different results when a polygon is self-intersecting or several polygons overlap. When the boundaries of two polygons defined by an odd winding number intersect, the parity of the area common to both flips from odd to even, as seen in FIG. 4a. Thus, instead of being filled twice, the common area is not filled at all. This is why parity techniques must rasterize each polygon individually, and need a second frame buffer to accumulate the image.

If a positive winding number is used, overlapping interiors just have greater winding numbers and are still filled as shown in FIG. 4b. Thus, if polygons are defined by positive winding numbers, the boundaries for several of them can be collected and their interiors filled in a single sweep through the scan lines. An adaptation of the ordered-edge-list method to polygons defined by a non-zero winding number involves giving each edge a direction number of −1 or +1, based on whether one moves up or down along the edge as one traces the polygon boundary counter-clockwise. As one steps along a scan line and notes intersections with the boundary, the direction numbers of the edges crossed are added. This total is the winding number for the current point as illustrated in FIG. 5.

It is an object of the present invention, therefore, to provide a new and simple method for rasterizing graphic images. It is another object of the present invention to provide a system wherein the time dependency for rasterization is proportional to the perimeter of the objects drawn rather than their area, and to provide a method that can be supported by hardware and can offer a significant advantage in high-speed image generation. It is another object of the present invention to be capable of rasterizing any shape for which a positive winding number boundary can be drawn. Further advantages of the present invention will become apparent as the following description proceeds and the features characterizing the invention will be pointed out with particularity in the claims annexed to and forming a part of this specification.

SUMMARY OF THE INVENTION

Briefly, the present invention is a system having a frame buffer for generating an image wherein the image is defined as an outline having an interior described by the non-zero winding rule, the system including the method of providing visual images along a scan direction comprising the steps of entering into the frame buffer predetermined direction codes, determining points of intersection and points of adjacent location in the scan direction, and spatially offsetting direction codes in the scan direction for said points of intersection and points of adjacent location in the scan direction.

IN THE DRAWINGS

For a better understanding of the present invention, reference may be had to the accompanying drawings wherein the same reference numerals have been applied to like parts and wherein.

DETAILED DESCRIPTION OF THE INVENTION

In accordance with the present invention, the boundaries of polygons defined by a positive winding number are drawn directly in the frame buffer rather than stored in an ordered edge-list similar to the parity rasterization techniques. This eliminates the decomposition and sorting overhead of the edge-list technique, and allows more flexibility in the types of curves used in the boundary and the methods used to generate them.

Figure 1A:
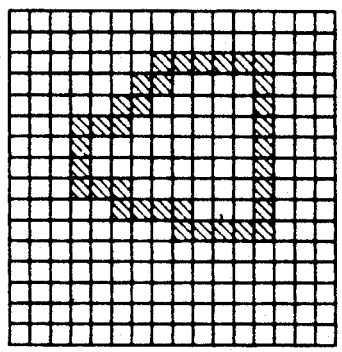
FIG. 1 illustrates a first prior art graphics imaging technique.
Figure 1B:
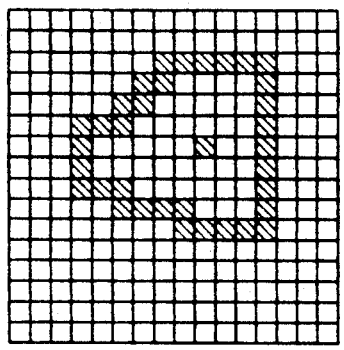
Figure 1C:
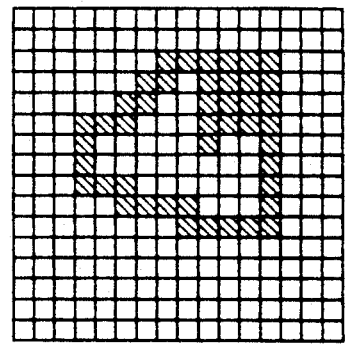
Figure 1D:
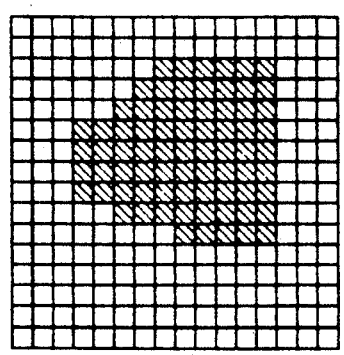
Figure 2A:
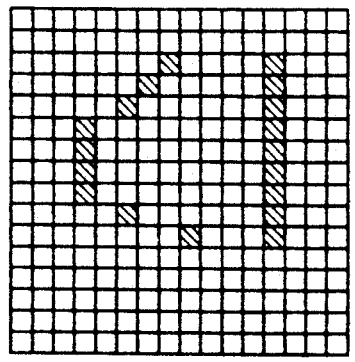
FIG. 2 illustrates a second prior art graphics imaging technique.
Figure 2B:
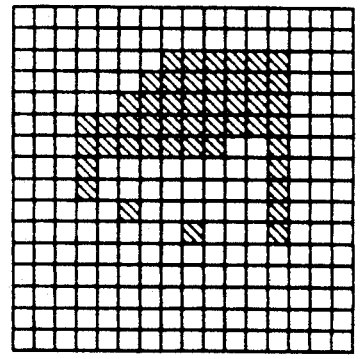
Figure 2C:
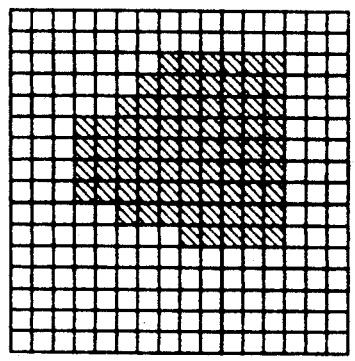
Figure 3A:
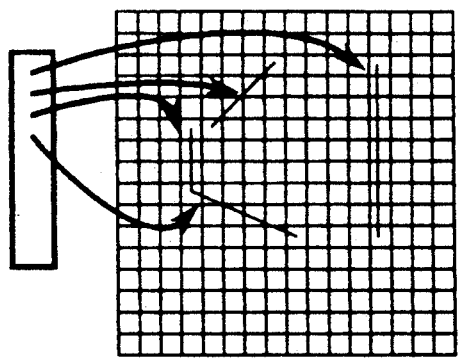
FIG. 3 illustrates a third prior art graphics imaging technique.
Figure 3B:
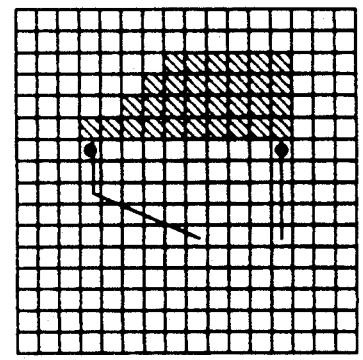
Figure 3C:
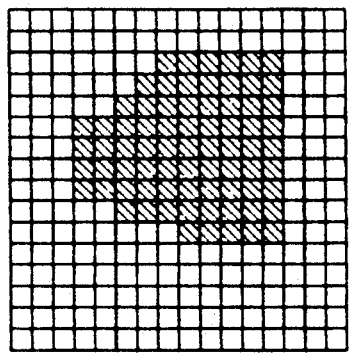
Figure 4A:
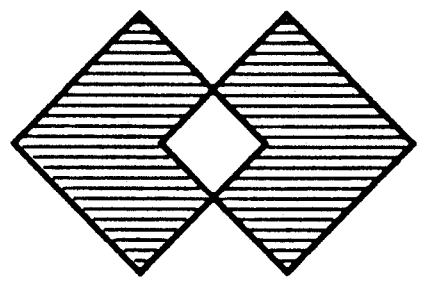
FIGS. 4a and 4b illustrate the intersection of the boundaries of two polygons defined by an odd winding number and by a positive winding number.
Figure 4B:
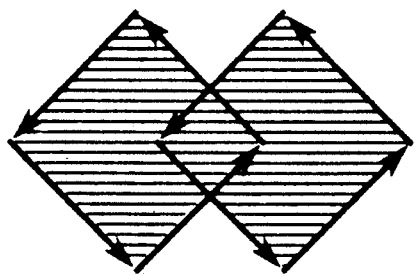
Figure 5:
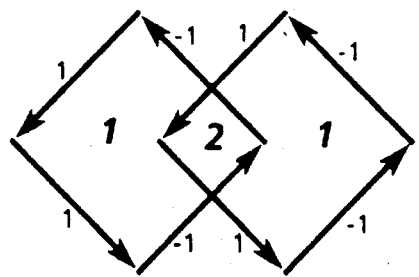
FIG. 5 is an illustration of direction and winding numbers along a scan line.
Figure 6:
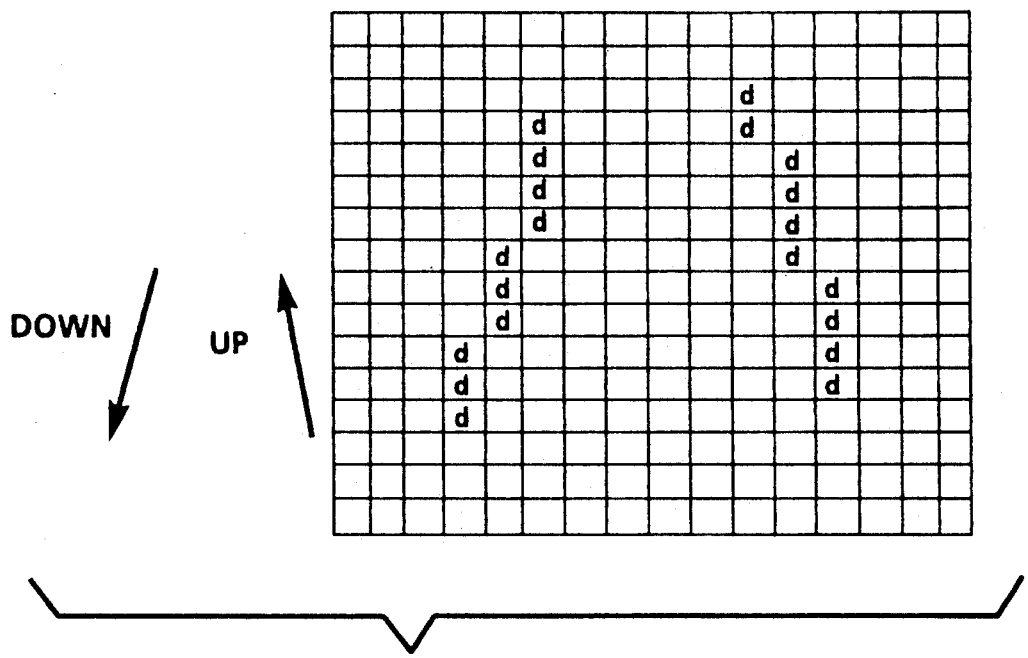
FIG. 6 is an illustration of up and down states or boundaries in accordance with the present invention.

To generalize the frame buffer to handle single-color filling of positive-winding-number polygons, each pixel is allowed to have three states (background, down, up). This is most easily done by assigning two bits of storage to each pixel. The polygon boundary generated counter-clockwise and entered into the frame buffer by changing the original pixel value (background) to either up or down. As in the parity algorithms, only the left and right edges are entered (horizontal runs are not drawn) as shown in FIG. 6. The up and down states correspond to the direction numbers.

If the edge is generated from low scan lines to high scan lines the up state is stored, and if it is generated in a downward direction, the down state is stored. The boundaries for all polygons can be entered before the rasterization step. This step might be carried out in conjunction with display of the frame buffer. In the rasterization stage, one steps through the raster scan line by scan line as in parity algorithms. For a scan line, the winding number is initialized to zero and each pixel is examined. If the value is down, the winding number is incremented. If the value is up, the winding number is decremented. All pixels with a positive winding number are shaded.

Figure 7:
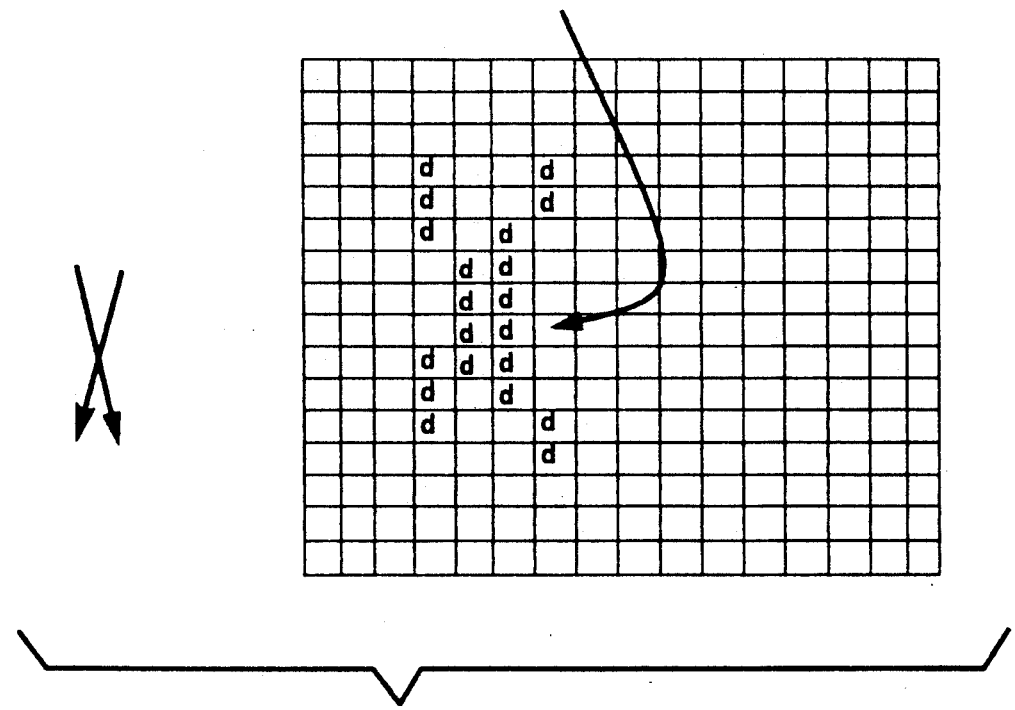
FIG. 7 is an illustration of handling collisions in accordance with the present invention.

Up to this point, the method has problems at the point where two or more edges coincide as shown in FIG. 7. At these points the winding number should be changed to reflect the total increment or decrement due to all edges, but having only the two states up and down allows changes of only −1 or 1. The breakthrough which solves this problem is the realization that pixel values for colliding boundaries can be spatially offset without serious damage to the image. When a down state is to be entered, the pixel is first checked. If its value is background, the down state is entered. If the value is up, the increment and decrement of the two edges cancel, and the value background is entered. If the value is already down, consider the next pixel to the right and repeat the calculation. Thus, a series of colliding down edges result in a series of down entries propagating to the right. At the end of the series the winding number will be correct. Drawing upward edges are handled similarly, except when the pixel already has an up value the pixel to the left is checked.

Figure 8:
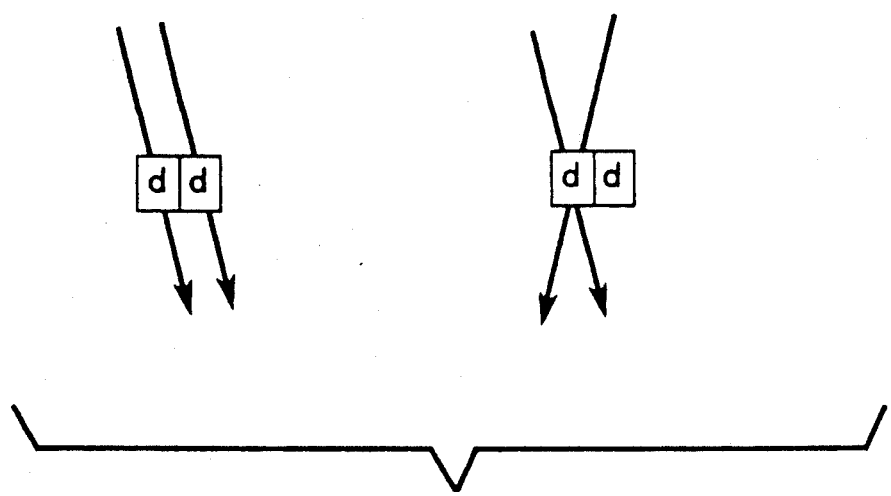
FIG. 8 is an illustration of possible ambiguity from collision handling.

The scheme is not completely free of errors. Two down pixels in a row can result either from two downward lines passing through the separate pixels, or by both passing through the left pixel as shown in FIG. 8. One cannot distinguish the two cases. So if an upward line is drawn through the left point, one does not known whether the left or right down pixel should be canceled. Note, however, that such errors are localized to the area of the collision series, and occur only if both up and down lines are present.

One common situation where such collisions can occur is along clipping boundaries where several polygons are clipped to a common edge. In these cases when an up value collides with a series of down pixels it is best to cancel the rightmost pixel in the series. Likewise, when a down pixel collides with a series of up pixels the leftmost should be canceled. This strategy prevents shrinkage of the clipping region.

The following is an algorithm to implement the above procedure:

A. Set all points in the extended frame buffer to background.

B. Enter the boundaries for all polygons
   1. Step counter-clockwise around the polygon boundary generating pixel coordinates for the left and right boundaries.
   2. For each pixel on a downward edge call StoreDownPoint.
   For each pixel on an upward edge call StoreUpPoint.

C. Display the image
   1. For each scan line
   Set the winding number to 0.
   Step through the pixels on the scan line
      if a pixel has the value down, increment the winding number
      if a pixel has the value up, decrement the winding number
      if the winding number is positive, display the pixel as shaded, otherwise display it as unshaded.

Thus in the extended frame buffer each pixel has three possible states, background, up, and down. Points are entered into the frame buffer by the following two procedures.

StoreDownPoint
   repeat until a pixel value has been stored
   if the value of the current pixel is background then store the value down
   if the value of the current pixel is down then step to the next pixel on the right
   if the value of the current pixel is up
      then if the value of the next pixel on the left is not up, store the value background
      otherwise step to the next pixel on the left.

StoreUpPoint
   repeat until a pixel value has been stored
   if the value of the current pixel is background, then store the value up
   if the value of the current pixel is up, then step to the next pixel on the left
   if the value of the current pixel is down
      then if the value of the next pixel on the right is not down then store the value background
      otherwise step to the next pixel on the right.

This is a new and simple method for rasterizing graphic images. It is capable of rasterizing any shape for which a positive winding number boundary can be drawn. One need not have analytic forms for the boundary, draw it in scan order, nor divide it at extreme points. The time dependency for rasterization is proportional to the perimeter of the objects drawn rather than their area. The method can be supported by hardware and can offer a significant advantage in high-speed image generation.

In accordance with the present invention, at the start of a page the frame-buffer is cleared so as to contain only background values. A polygon is entered into the frame buffer by changing the state of pixels along its left and right edges. Edges drawn downward are set to the down state, and those drawn upward are set to the up state. On imaging, the buffer is swept across a scan line at a time (left to right). At the start of each scan line the winding number is set to 0. If a down pixel is encountered the winding number is incremented; if an up pixel is encountered it is decremented. Pixels corresponding to a positive (or non-zero) winding number are shaded. The algorithm handles collisions where several edges intersect the same pixel. The scheme is to move spatially left or right to find a pixel where the change can be entered. A collision of an up state with a down state causes the two to cancel. A collision of down states causes a chain of down pixels propagating to the right, and a collision of up states caused propagation to the left. The problem with this scheme is that localized errors can arise from the ambiguity as to whether a pixel is set because a boundary edge passes through it or because several edges pass through a neighbor.

A solution to the above described dilemma requires additional pixel states and additional computation. However, it exactly represents the winding number changes at each pixel, so it is free of errors. In particular, in order to represent the winding number change exactly, two additional states are defined. The states will be labeled by the left and right parentheses "(", ")". Therefore, each pixel in the frame-buffer must be capable of taking on five states. These new states are used to delimit the winding number changes for pixels.

Figure 9:
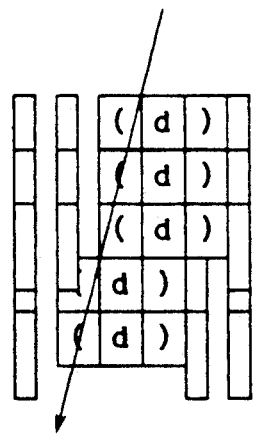
FIGS. 9–13 illustrate two additional states to exactly represent the winding number change in accordance with the present invention.
Figure 10:
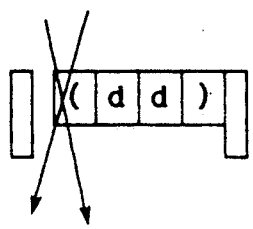

When a pixel is first found to lie on a boundary edge (for example, a downward edge), three pixels are changed in the frame-buffer. The pixel through which the edge passes will get a left parenthesis state "(". The next pixel on the right is marked with the down state "d", and the second pixel to the right gets the right parenthesis state ")" (see FIG. 9). If a second downward edge should pass through the pixel, a second down state is inserted between the parentheses. The right parenthesis shifts over one pixel to accommodate the additional state (see FIG. 10).

Figure 11:
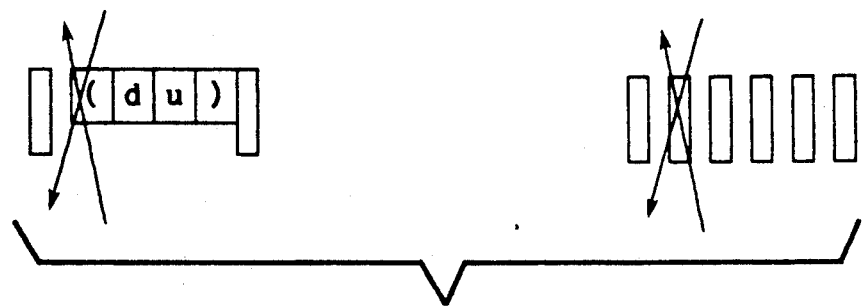
Figure 12:
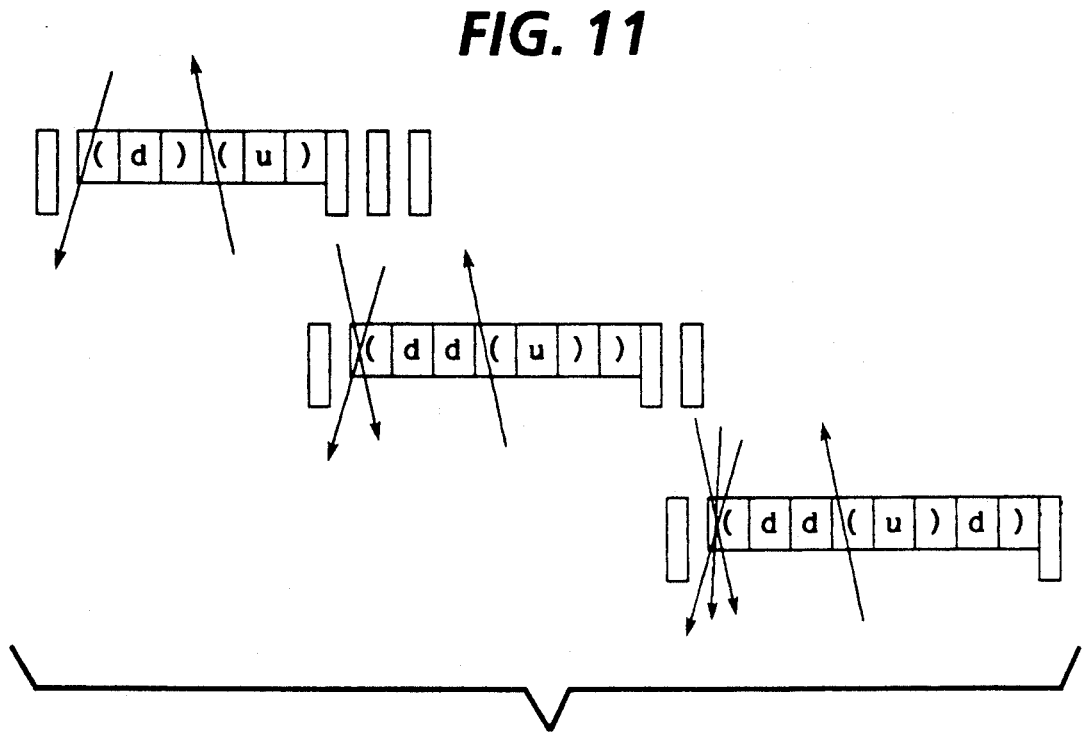

If an upward edge passes through the same pixel as a downward edge, one can either include both up and down states between parentheses, or one can cancel an up with a down state to reduce or eliminate the list (see FIG. 11). The up and down states affecting a pixel are enclosed in parentheses, with the left parenthesis indicating the boundary-edge pixel. As additional states are added, the list grows to the right. If it should encounter another list belonging to some pixel on its right, it skips past this second list and continues growing to its right (see FIG. 12).

Figure 13:
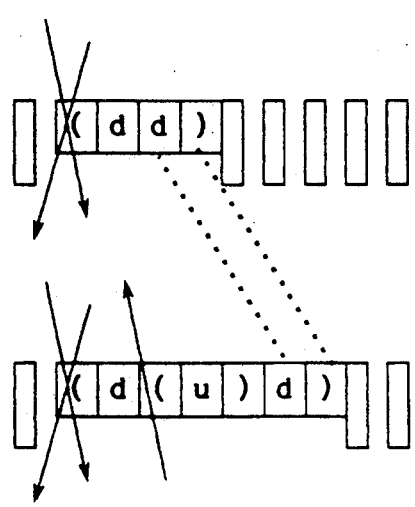

If an edge passes through a pixel for the first time, but that pixel already has a non-background value as part of the list for a pixel on its left, the values for this earlier list are shifted right three pixels to made room for the new list (see FIG. 13). As before, if a list is encountered to the right, it is skipped over and the displacement continues beyond it.

With this scheme, marking an edge can require changing up to three pixels from background to list structures, for each pixel through which the edge passes. Thus, very dense pictures can produce long lists, which always grow to the right. The problem of a list growing past the edge of the frame-buffer can be handled by just letting it wrap to the left side of the next scan line. This is often the way the frame-buffer memory is organized; no special handling is required at the edge of the frame-buffer. Note that when increasing the resolution of the imaging device the space available for this encoding increases as the square, while the number of edge pixels to be processed increases only linearly.

Figure 14:
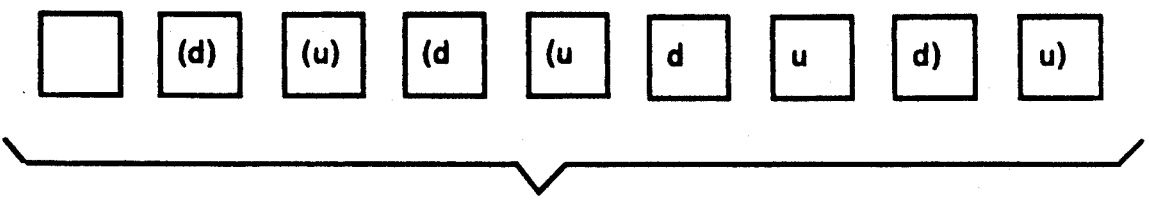
FIGS. 14–17 illustrate the manner of reducing the length of state lists in accordance with the present invention.
Figure 15:
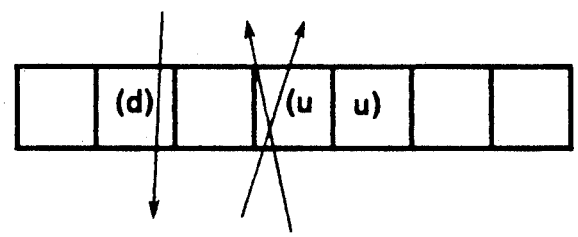
Figure 16:
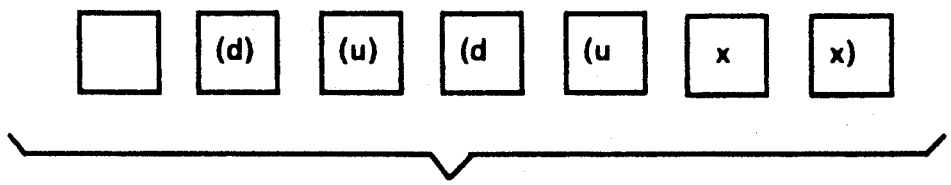

The length of the state lists can be reduced if each pixel is allowed additional states. With the 9 states shown in FIG. 14, lists can be built with only one pixel changed on a scan line for each edge passing through that scan line (see FIG. 15). If up and down states for a single pixel always cancel, a list will contain either all up states or all down states. Under this assumption, there are only 7 states required to represent lists with length proportional to the number of uncancelled boundary edges through a pixel as shown in FIG. 16.

Figure 17:
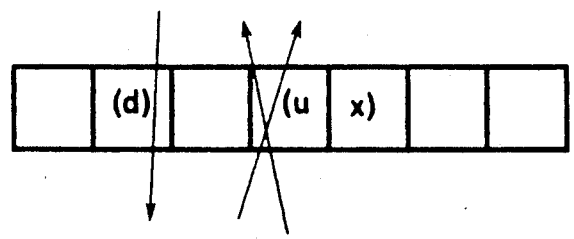
Figure 6:
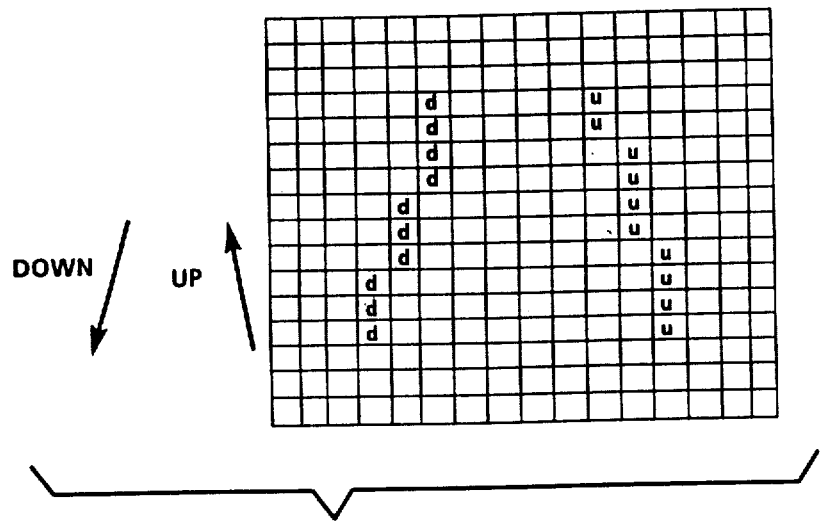
Figure 7:
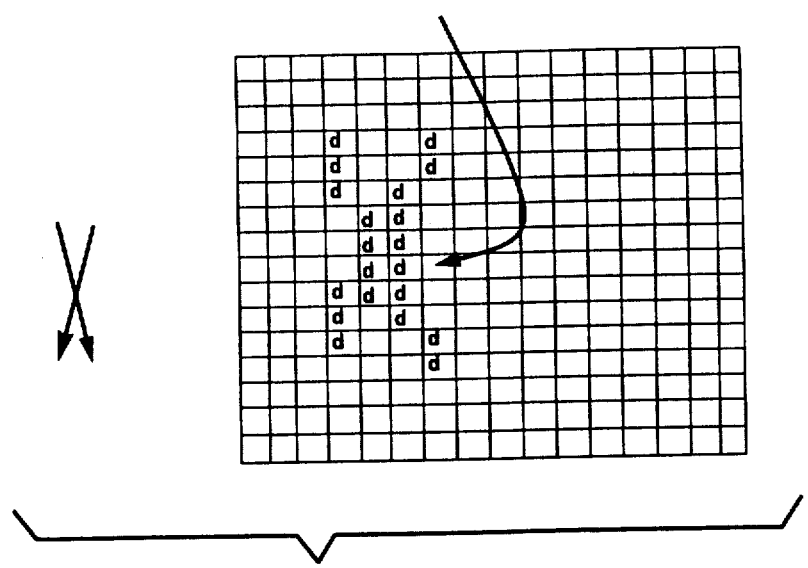
Figure 9:
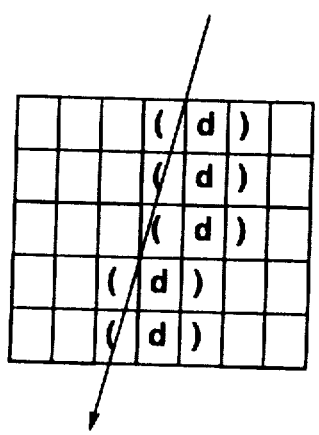
Figure 10:
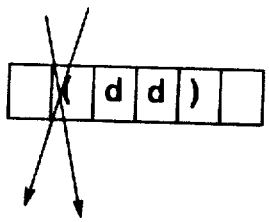
Figure 11:
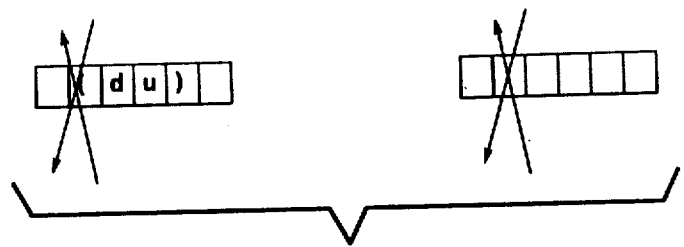
Figure 12:
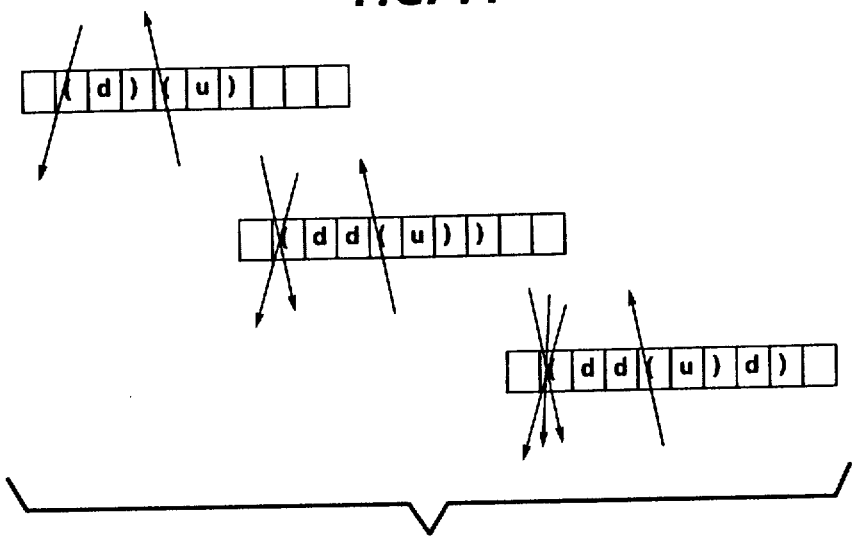
Figure 13:
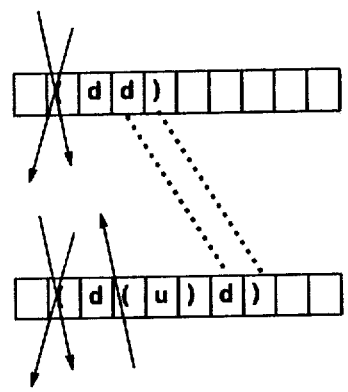

Here the first pixel in the list indicates whether it is a list of up or down edges, and for the remaining pixels in the list, "x" and "x)" count how many edges there are (see FIG. 17). In a binary computer system there is an advantage in requiring less than 8 states since that requires only three bits per pixel rather than four.

A further reduction in the length of the lists can be achieved by adding still more states. For example, one could add states which represent 2, 4 or 8 instances of the state in the list. However, a reduction can be achieved without new states by simply redefining the two states (up and down) to be 0 and 1 and then encoding the change in the winding number for the pixel as a binary number. For example, if five downward lines passed through a pixel, the change in the winding number would be +5. Instead of using the list (d d d d d), this could be represented by the list (0 1 0 1). The leading 0 establishes the sign of the number.

Usually, the boundaries of image components will be widely dispersed with little intersection or overlap. Thus it is expected that such encoding schemes will not be needed. The likelihood of overlap will lessen somewhat with increasing resolution since near edges which fall in the same pixel for low resolution can be mapped to separate pixels for high resolution. However for synthetic-graphic images, edges in pixels tend to be identical rather than just nearby, and in this case increasing resolution does not help. One operation which tends to create overlapping edges is clipping. If several objects overlap a clipping boundary, they will all be clipped to that boundary and have overlapping edges along the boundary. However, the degree of overlap of these edges is on the same order as degree of overlap of objects which is usually small.

The following is a sample implementation of the algorithms for managing the basic 5-state frame buffer encoding as described above. The procedures are coded in the C programming language.

It should be noted that an object entered into the extended frame buffer can later be removed or erased. Also, it should be noted that the scheme works for any boundary shape that can be sequentially generated, not just lines.

The first two routines deal with insertion of a value into a list for a given pixel. If a list does not already exist, one is created. The bulk of the work is done by the AddEntry procedure which inserts a single up, down, right parenthesis or left parenthesis value into the list for a pixel, shifting previous values to the right as needed. The EnterValue procedure uses AddEntry to create a list with the edge value (up or down) if one does not exist, or adds the value to an existing list. This sample implementation does not attempt to cancel up and down edges in a list.

AddEntry(x,y,value)
{parens=0;
putValue=value;
while ((oldValue=frame[x,y])!=BACKGROUND)
{if (oldValue==LEFTPARENTHESIS)
*parens=parens+1;*
else
if (parens==0)
{frame[x,y]=putValue;
putValue=oldValue;
}
else
if(oldValue==RIGHTPARENTHESIS)
*parens=parens−1;*
x=x+1;
}
frame[x,y]=putValue;
}

The purpose of the EnterValue procedure is to enter either three codes (a new list) or one code (a list extension) depending on whether or not a list exits for the pixel.

EnterValue(x,y, value)
{oldValue=frame[x,y];
if(oldValue!=LEFTPARENTHESIS)
{AddEntry(x,y, RIGHTPARENTHESIS);
AddEntry(x,y, value);
AddEntry(x,y, LEFTPARENTHESIS);
}
else AddEntry(x+1,y, value);
}

The DisplayFrame procedure will construct the image from the extended frame buffer. The call to Shade represents the hardware action of shading a pixel.

DisplayFrame()
{for(y=0; y<MAXFRAMEY; y++)
{windingNumber=0;
for(x=0; x<MAXFRAMEX; x++)
{value=frame[x,y];
if(value==LEFTPARENTHESIS)
parens=1;
else parens=0;
z=x+1;
while (parens>0)
{value=frame[z,y];
if((parens==1)&&(value==DOWN))
*windingNumber=windingNumber+1;*
if((parens==1)&&(value==UP))
*windingNumber=windingNumber−1;*
if(value==LEFTPARENTHESIS)
*parens=parens+1;*
if(value==RIGHTPARENTHESIS)
*parens=parens−1;*
z=z+1;
}
if(windingNumber!=0)
Shade(x,y);
}
}
}

Note that with this scheme the order and position of the up and down states within the "frame-buffer" no longer correspond directly with the pixels being imaged. The states which indicate changes in a winding number (and thereby changes in shading) are displaced by parentheses and other lists. The DisplayFrame procedure scans through the list structure for each pixel to determine its net winding-number change. The repeated access of pixels during display can be avoided by using a variation on the sample algorithms. The idea is to grow the lists in the opposite direction from that used in the display scan. Then during the display scan one first encounters the end of the list, followed by all the list element, and finally the first of the list, which also marks the pixel to which the list belongs. With this approach, by the time a pixel is reached, the change in winding number for that pixel will be known. Because one may be in the middle of several lists at the same time, an auxiliary data structure such as a stack is needed by the DisplayFrame procedure to maintain the various list subtotals. The following is an example of a DisplayFrame procedure for this approach. It assumes that the lists do not wrap across scan lines.

```
DisplayFrame()
{for (y=0; y<MAXFRAMEY; y++)
{StackTop=0;
windingNumber=0;
for (x=MAXFRAMEX-1; x>=0; x--)
{value=frame[x,y];
if (value==RIGHTPARENTHESIS)
{StackTop=StackTop+1;
Stack[StackTop]=0;
}
if (value==UP)
Stack[StackTop]=Stack[StackTop]+1;
if (value==DOWN)
Stack[StackTop]=Stack[StackTop]-1;
if (value==LEFTPARENTHESIS)
{windingNumber=windingNumber+Stack[StackTop];
StackTop=StackTop-1;
}
if (windingNumber!=0)
Shade(x,y);
}
}
}
```

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

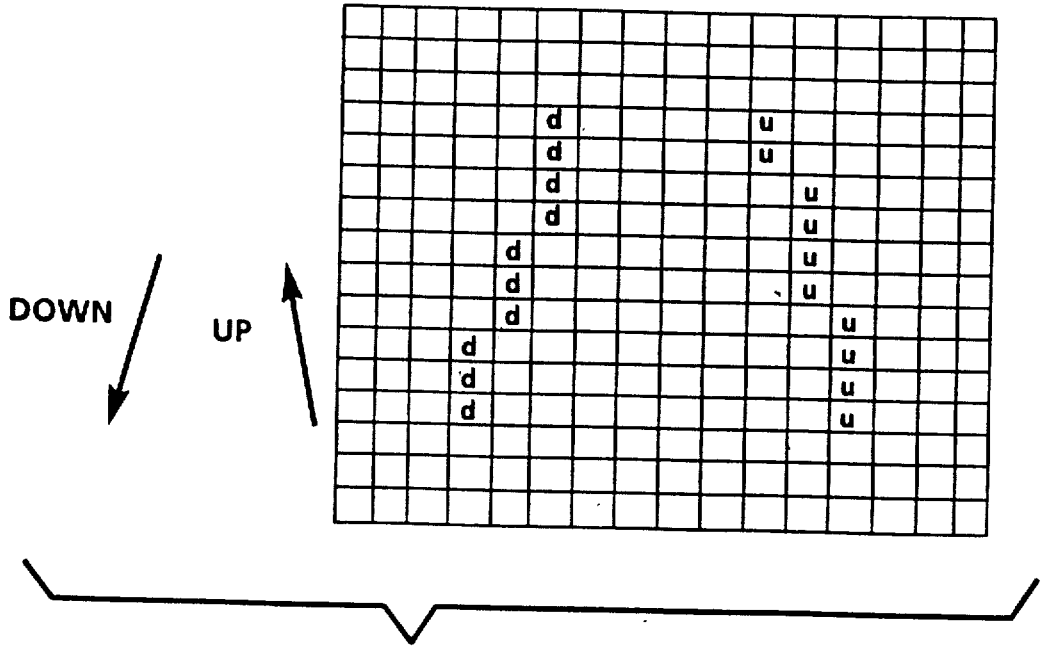

I claim:

1. In a raster device having a frame buffer organized into scan lines directed left to right, the method of providing a graphic image defined by a boundary and by winding numbers as a raster display of pixels of background states and up and down states comprising the steps of:

clearing the frame-buffer to include only background states, entering the boundary edges into the frame buffer by changing the state of pixels, the edges drawn downward being set to the down state, and the edges drawn upward being set to the up state, responding to collisions where at least two edges intersect the same pixel by moving spatially left or right to locate a pixel where the change can be entered in the frame buffer wherein a collision of an up state with a down state causes a background state, a collision of down states causes a chain of down pixels propagating to the right, and a collision of up states causes a chain of up pixels propagating to the left, sweeping across each scan line, at the start of each scan line, setting the winding number to 0, upon encountering a down pixel, incrementing the winding number, upon encountering an up pixel, decrementing the winding number, and shading pixels corresponding to a non-zero winding number.

2. In a raster device having a frame buffer organized into scan lines, the method of providing a graphic image defined by a boundary and by winding numbers as a raster display of pixels of background states and first and second states comprising:

clearing the frame-buffer to include only background states, entering the boundary edges into the frame buffer by changing the state of pixels, the edges drawn in the first direction being set to the first direction state, and the edges drawn in the second direction being set to the second direction state, responding to collisions where at least two edges intersect the same pixel by moving spatially orthogonal to the first and second directions, the motion for the edge in the first direction being opposed to the motion for the edge in the second direction, to locate a pixel where the change can be entered in the frame buffer wherein a collision of a first direction state with a second direction state causes a background state, sweeping across each scan line, at the start of each scan line, setting the winding number to 0, upon encountering a first state pixel, incrementing the winding number, upon encountering a second state pixel, decrementing the winding number, and shading pixels corresponding to a non-zero winding number.

3. In a raster scanning device, the method of imaging by pixels a graphic image defined by a boundary and by winding numbers comprising the steps of:

representing said graphic image by changing the state of pixels along the boundary edges, the edges drawn in a first direction being set to a first state, and the edges drawn in a second direction being set to a second state, responding to encounters, where two edges affect the state of the same pixel, by moving the state change for one of the edges to a neighboring pixel, initializing the winding number, for sweeping across scan lines, decrementing the winding number upon encountering a pixel in the first direction, incrementing the winding number upon encountering a pixel in the second direction, shading pixels corresponding to a predetermined winding number.

4. The method of claim 3 wherein the raster scanning device includes a frame buffer and including the step of clearing the frame-buffer to include only background states.

5. The method of claim 3 including the step of entering a graphic image into the frame buffer by changing the state of pixels along its edges, the edges drawn in a first direction being set to a first state, and those drawn in a second direction being set to a second state.

6. The method of claim 5 including the step of representing each pixel by first and second direction states and a background state.

7. The method of claim 3 including the step of sweeping the buffer across a scan line and at the start of each scan line, setting the winding number to 0.

8. The method of claim 7 including the step of representing each pixel by first and second direction states, a background state, and two additional states.

9. The method of claim 3 including the step of shading pixels corresponding to a positive winding number.

10. The method of claim 3 including the step of responding to collisions where at least two edges intersect the same pixel by moving spatially to locate a pixel where the change can be entered in the frame buffer.

11. The method of claim 10 including the step of responding to abutments where two edges occupy adjacent pixels by moving spatially to locate a pixel where the change can be entered in the frame buffer.

12. The method of claim 11 wherein a collision of a pixel of a first state with a pixel of a second state causes the two pixels to cancel.

13. The method of claim 12 wherein a collision of of pixels of the first state causes a chain of pixels propagating in the first direction and a collision of pixels of the second state causes a chain of pixels propagating in the second direction.

14. In a raster device having memory, the method of providing an image represented by pixels comprising the steps of:
    defining the outline of the image and storing the defined outline in the memory,
    identifying boundary pixels corresponding to the outline,
    systematically storing in memory a direction code for said boundary pixels,
    determining if a given boundary pixel is already represented by a first direction code, and
    storing a second direction code in a neighboring memory location of a pixel for boundary pixels already represented by a first direction code.

15. In a system having a frame buffer organized into scan lines for generating an image wherein the image is defined as an outline having an interior described by the non-zero winding rule, the method of providing visual images along a scan direction comprising the steps of:
    entering into the frame buffer predetermined direction codes for the outline,
    determining points of intersection and points of adjacent location in the scan direction, and
    spatially offsetting direction codes in the frame buffer in the scan direction for said points of intersection and points of adjacent location in the scan direction.

16. In a system having a frame buffer for generating an image wherein the image is defined as an outline having an interior described by the non-zero winding rule, the method of providing visual images along a scan direction comprising the steps of:
    entering into the frame buffer predetermined direction codes for the outline, the direction codes representing up, down, right, and left states for each pixel,
    determining points of intersection and points of adjacent location in the scan direction, and
    identifying said points of intersection and points of adjacent location in the scan direction for each pixel by use of said up, down, right, and left states.

17. In a raster device having a frame buffer organized into scan lines, the method of providing a graphic image defined by a boundary and by winding numbers as a raster display of pixels of background states, first and second states, and list start and list end states comprising:
    clearing the frame-buffer to include only background states,
    entering the boundary edges into the frame buffer by changing the state of pixels, the edges drawn in the first direction being set to the first direction state, and the edges drawn in the second direction being set to the second direction state,
    responding to collisions where a pixel is not in a background state by forming lists of edge states using a start-edge state to mark the beginning of a list, and an end-edge state to mark the end of the list, the states being arranged in the frame buffer along the scan line with direction states lying between start and end states, start edge states being positioned at the pixel where the collision occurs,
    sweeping across each scan line,
    at the start of each scan line, setting the winding number to 0,
    upon encountering a first state pixel, incrementing the winding number,
    upon encountering a second state pixel, decrementing the winding number, and
    shading pixels corresponding to a non-zero winding number.

18. The method of claim 17 including the step of responding to collisions by forming lists of the direction states.

* * * * *

UNITED STATES PATENT AND TRADEMARK OFFICE
CERTIFICATE OF CORRECTION

PATENT NO. : 5,043,711

DATED : 08/27/91

INVENTOR(S) : Steven J. Harrington

It is certified that error appears in the above--identified patent and that said Letters Patent is hereby corrected as shown below:

Per attached Title Page. The title Page should be deleted to appear as

In figures 9, 10, 11, 12, and 13, all rectangular boxes are changed to squares as shown in attached drawings to provide uniformity in representation of pixels on the drawings.

In figure 6, the letters "d" in the right column are changed to the letter "u" with the further changes of horizontally aligning the letters "d" with the letters "u" illustrated in attached figure 6.

Signed and Sealed this

Twenty-second Day of June, 1993

Attest:

MICHAEL K. KIRK

Attesting Officer

Acting Commissioner of Patents and Trademarks

United States Patent [19]

Harrington

[11] Patent Number: 5,043,711

[45] Date of Patent: Aug. 27, 1991

[54] REPRESENTATION OF POLYGONS DEFINED BY NON-ZERO WINDING NUMBERS

[75] Inventor: Steven J. Harrington, Holley, N.Y.

[73] Assignee: Xerox Corporation, Stamford, Conn.

[21] Appl. No.: 363,827

[22] Filed: Jun. 9, 1989

[51] Int. Cl.$^5$ ............................................... G09G 1/06
[52] U.S. Cl. ................................ 340/728; 360/747; 364/522
[58] Field of Search ............ 340/747, 728, 703; 364/522

[56] References Cited

U.S. PATENT DOCUMENTS

| | | | |
|---|---|---|---|
| 4,364,037 | 12/1982 | Walker | 340/703 |
| 4,554,538 | 11/1985 | Bieneman | 340/799 |
| 4,646,076 | 2/1987 | Wiedenman et al. | 340/728 |
| 4,677,574 | 6/1987 | Kausch | 340/703 |
| 4,815,009 | 3/1989 | Blatin | 364/518 |

OTHER PUBLICATIONS

"Polygon Painting Method". IBM Technical Disclosure Bulletin, vol. 28, No. 7. Dec. 1985. pp. 3080-3081.

Primary Examiner—Alvin E. Oberley
Assistant Examiner—Doon Yue Chow
Attorney, Agent, or Firm—Ronald F. Chapuran

[57] ABSTRACT

In a system having a frame buffer for generating an image wherein the image is defined as an outline having an interior described by the non-zero winding rule, the system including the mehtod of providing visual images along a scan direction comprising the steps of entering into the frame buffer predetermined direction codes, determining points of intersection and points of adjacent location in the scan direction, and spatially offsetting direction codes in the scan direction for the points of intersection and points of adjacent location in the scan direction.

18 Claims, 8 Drawing Sheets